United States Patent
Linton et al.

(10) Patent No.: US 10,681,030 B2
(45) Date of Patent: *Jun. 9, 2020

(54) CONTROLLING INTER-COMMUNICATIONS BETWEEN DEVICE BASED ON FIRMWARE COMPATIBILITY

(71) Applicant: International Business Machines Corporation, Armonk, NY (US)

(72) Inventors: Jeb R. Linton, Manassas, VA (US); Christopher M. Poulin, Walpole, MA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/396,015

(22) Filed: Apr. 26, 2019

(65) Prior Publication Data
US 2019/0253405 A1 Aug. 15, 2019

Related U.S. Application Data

(63) Continuation of application No. 15/290,142, filed on Oct. 11, 2016, now Pat. No. 10,326,749.

(51) Int. Cl.
| | |
|---|---|
| *H04L 29/06* | (2006.01) |
| *G06F 21/57* | (2013.01) |
| *G06F 21/44* | (2013.01) |
| *H04L 9/32* | (2006.01) |

(52) U.S. Cl.
CPC .............. *H04L 63/08* (2013.01); *G06F 21/44* (2013.01); *G06F 21/57* (2013.01); *H04L 9/3218* (2013.01)

(58) Field of Classification Search
CPC . H04L 9/3218; H04L 9/3236; H04L 63/0876; H04L 63/08
See application file for complete search history.

(56) References Cited

U.S. PATENT DOCUMENTS

| | | |
|---|---|---|
| 9,154,483 B1 | 10/2015 | Haskin et al. |
| 9,307,405 B2 | 4/2016 | Curtis et al. |
| 9,621,650 B2 * | 4/2017 | Raman ................ G06F 16/5866 |
| 9,940,175 B2 | 4/2018 | He et al. |
| 10,243,964 B2 | 3/2019 | Kraemer et al. |
| 2009/0150878 A1 | 6/2009 | Pathak et al. |
| 2012/0297370 A1 | 11/2012 | Sale |
| 2014/0244834 A1 | 8/2014 | Guedalia et al. |

(Continued)

OTHER PUBLICATIONS

U.S. Appl. No. 15/290,169, 2018/0102901 A1, Non-final Office Action dated Jun. 4, 2018.

(Continued)

*Primary Examiner* — Chau Le
*Assistant Examiner* — Vance M Little
(74) *Attorney, Agent, or Firm* — Law Office of Jim Boice

(57) ABSTRACT

A computer-implemented method validates firmware levels for peer-to-peer communication in a network. Communication rules between a first device and a second device are utilized to validate firmware levels between the first device and the second device on a network using zero knowledge communication authentications. Communication between the first device and the second device via the network is disabled in response to determining that firmware in the first device is not compatible with firmware in the second device.

20 Claims, 6 Drawing Sheets

(56) References Cited

U.S. PATENT DOCUMENTS

| | | |
|---|---|---|
| 2014/0380419 A1 | 12/2014 | Peluso et al. |
| 2015/0067667 A1* | 3/2015 | Chan .................... G06F 16/178 717/169 |
| 2015/0169851 A1 | 6/2015 | Boivie |
| 2015/0299654 A1 | 8/2015 | Perier |
| 2016/0127357 A1 | 5/2016 | Zibuschka et al. |
| 2017/0054562 A1 | 2/2017 | Cooper |
| 2017/0178263 A1 | 6/2017 | Kraemer et al. |
| 2017/0277904 A1 | 9/2017 | Adams et al. |
| 2017/0277909 A1 | 9/2017 | Kraemer et al. |
| 2017/0279611 A1 | 9/2017 | Kraemer et al. |
| 2018/0019873 A1 | 1/2018 | Kraemer et al. |
| 2018/0102901 A1 | 4/2018 | Linton et al. |

OTHER PUBLICATIONS

U.S. Appl. No. 15/290,142, 2018/0103023 A1, Non-final Office Action dated Jun. 27, 2018.

P. Mell et al., "The NIST Definition of Cloud Computing", National Institute of Standards and Technology, Information Technology Laboratory, Sep. 2011, pp. 1-7.

P. Flood et al., "Peer to Peer Authentication for Small Embedded Systems: A Zero-Knowledge-Based Approach to Security for the Internet of Things", IEEE, The 10th International Conference on Digital Technologies, 2014, pp. 68-72.

B. Ndibanje et al., "Security Analysis and Improvements of Authentication and Access Control in the Internet of Things", Sensors (Basel, Switzerland), 14(8), Aug. 13, 2014, pp. 14786-14805.

P. Brody et al., "Device Democracy: Saving the Future of the Internet of Things", IBM, 2015, pp. 1-19.

R. Barry, "What Is Freertos+Nabto?", Real Time Engineers Ltd., <www.freertos.org>, Retrieved Sep. 29, 2016, pp. 1-5.

List of IBM Patent Applications to Be Treated as Related, Apr. 26, 2019.

* cited by examiner

CONTROLLING INTER-COMMUNICATIONS BETWEEN DEVICE BASED ON FIRMWARE COMPATIBILITY

BACKGROUND

The present invention relates to the field of hardware devices, and particularly to hardware devices that communicate among one another.

SUMMARY

A computer-implemented method validates firmware levels for peer-to-peer communication in a network. Communication rules between a first device and a second device are utilized to establish a session to validate firmware levels between the first device and the second device on a network. The first device utilizes a first zero knowledge communication authentication with the second device to get a first assessment and a first proof. The second device utilizes a second zero knowledge communication authentication with the first device to get a second assessment and a second proof. The first and second assessments are outputs of respective firmware in the second device and the first device using a known input. The first proof and the second proof are reports derived from hashed values of respective intermediate states during execution of firmware in the second device and the first device. The hashed values of the respective intermediate states during execution of the firmware in the first device are made up of a string of bits. One or more processors determine whether a predetermined portion of the string of bits matches a known string of correct bits for the first proof, where the predetermined portion is less than all of the string of bits. Firmware in the first device is determined not to be compatible with firmware in the second device, in response to determining that the predetermined portion of the string of bits does not match the known string of correct bits for the first proof. The processor(s) check the second proof by the first device to get a third assessment. The processor(s) check the first proof by the second device to get a fourth assessment. Communication between the first device and the second device via the network is disabled in response to determining that the firmware in the first device is not compatible with firmware in the second device.

In one or more embodiments of the present invention, the method may be implemented as a system and/or computer program product.

DETAILED DESCRIPTION

Figure 1:
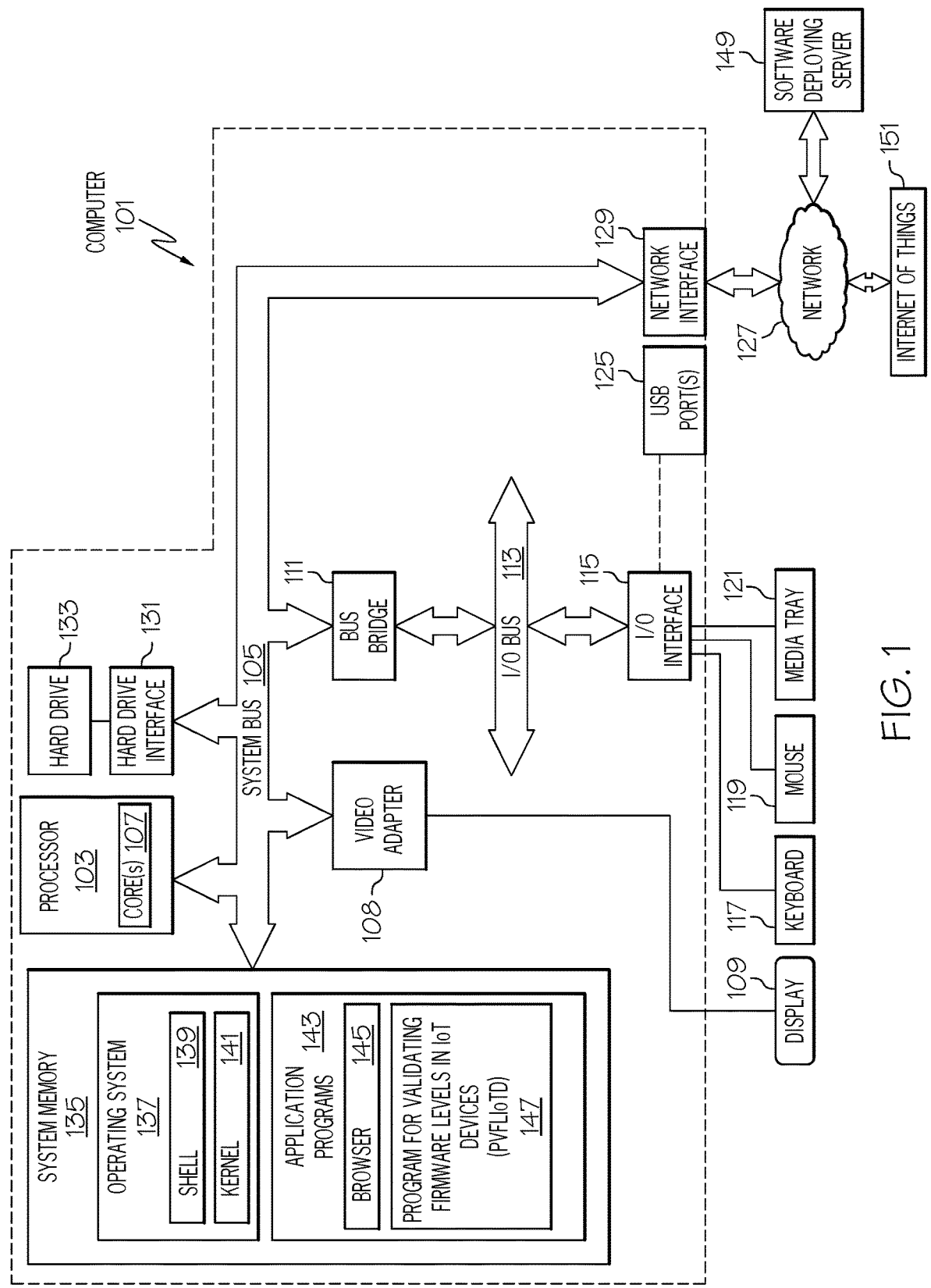
FIG. 1 depicts an exemplary system and network in which the present disclosure may be implemented.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Hash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

With reference now to the figures, and in particular to FIG. 1, there is depicted a block diagram of an exemplary system and network that may be utilized by and/or in the implementation of the present invention. Some or all of the exemplary architecture, including both depicted hardware and software, shown for and within computer 101 may be utilized by software deploying server 149 and/or processors found in devices in an Internet of Things 151 shown in FIG. 1.

Exemplary computer 101 includes a processor 103 that is coupled to a system bus 105. Processor 103 may utilize one or more processors, each of which has one or more processor cores 107. A video adapter 108, which drives/supports a display 109 (which may be a touch-screen display capable of detecting touch inputs onto the display 109), is also coupled to system bus 105. System bus 105 is coupled via a bus bridge 111 to an input/output (I/O) bus 113. An I/O interface 115 is coupled to I/O bus 113. I/O interface 115 affords communication with various I/O devices, including a keyboard 117, a mouse 119, a media tray 121 (which may include storage devices such as CD-ROM drives, multimedia interfaces, etc.), and external USB port(s) 125. While the format of the ports connected to I/O interface 115 may be any known to those skilled in the art of computer architecture, in one embodiment some or all of these ports are universal serial bus (USB) ports.

As depicted, computer 101 is able to communicate with a software deploying server 149 and/or other devices/systems using a network interface 129. Network interface 129 is a hardware network interface, such as a network interface card (NIC), etc. Network 127 may be an external network such as the Internet, or an internal network such as an Ethernet or a virtual private network (VPN). In one or more embodiments, network 127 is a wireless network, such as a Wi-Fi network, a cellular network, etc.

A hard drive interface 131 is also coupled to system bus 105. Hard drive interface 131 interfaces with a hard drive 133. In one embodiment, hard drive 133 populates a system memory 135, which is also coupled to system bus 105. System memory is defined as a lowest level of volatile memory in computer 101. This volatile memory includes additional higher levels of volatile memory (not shown), including, but not limited to, cache memory, registers and buffers. Data that populates system memory 135 includes computer 101's operating system (OS) 137 and application programs 143.

OS 137 includes a shell 139, for providing transparent user access to resources such as application programs 143. Generally, shell 139 is a program that provides an interpreter and an interface between the user and the operating system. More specifically, shell 139 executes commands that are entered into a command line user interface or from a file. Thus, shell 139, also called a command processor, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 141) for processing. While shell 139 is a text-based, line-oriented user interface, the present invention will equally well support other user interface modes, such as graphical, voice, gestural, etc.

As depicted, OS 137 also includes kernel 141, which includes lower levels of functionality for OS 137, including providing essential services required by other parts of OS 137 and application programs 143, including memory management, process and task management, disk management, and mouse and keyboard management.

Application programs 143 include a renderer, shown in exemplary manner as a browser 145. Browser 145 includes program modules and instructions enabling a world wide web (WWW) client (i.e., computer 101) to send and receive network messages to the Internet using hypertext transfer protocol (HTTP) messaging, thus enabling communication with software deploying server 149 and other systems.

Application programs 143 in computer 101's system memory (as well as software deploying server 149's system memory) also include a Program for Validating Firmware Levels in IoT Devices (PVFLIoTD) 147. PVFLIoTD 147 includes code for implementing the processes described below, including those described in FIGS. 2-4. In one embodiment, computer 101 is able to download PVFLIoTD 147 from software deploying server 149, including in an on-demand basis, wherein the code in PVFLIoTD 147 is not downloaded until needed for execution. In one embodiment of the present invention, software deploying server 149 performs all of the functions associated with the present invention (including execution of PVFLIoTD 147), thus freeing computer 101 from having to use its own internal computing resources to execute PVFLIoTD 147.

As shown, computer 101 may also be coupled via network 127 to an Internet of Things (IoT) 151, which are intelligent devices that are able to communicate with one another.

The hardware elements depicted in computer 101 are not intended to be exhaustive, but rather are representative to highlight essential components required by the present invention. For instance, computer 101 may include alternate memory storage devices such as magnetic cassettes, digital versatile disks (DVDs), Bernoulli cartridges, and the like. These and other variations are intended to be within the spirit and scope of the present invention.

Figure 2:
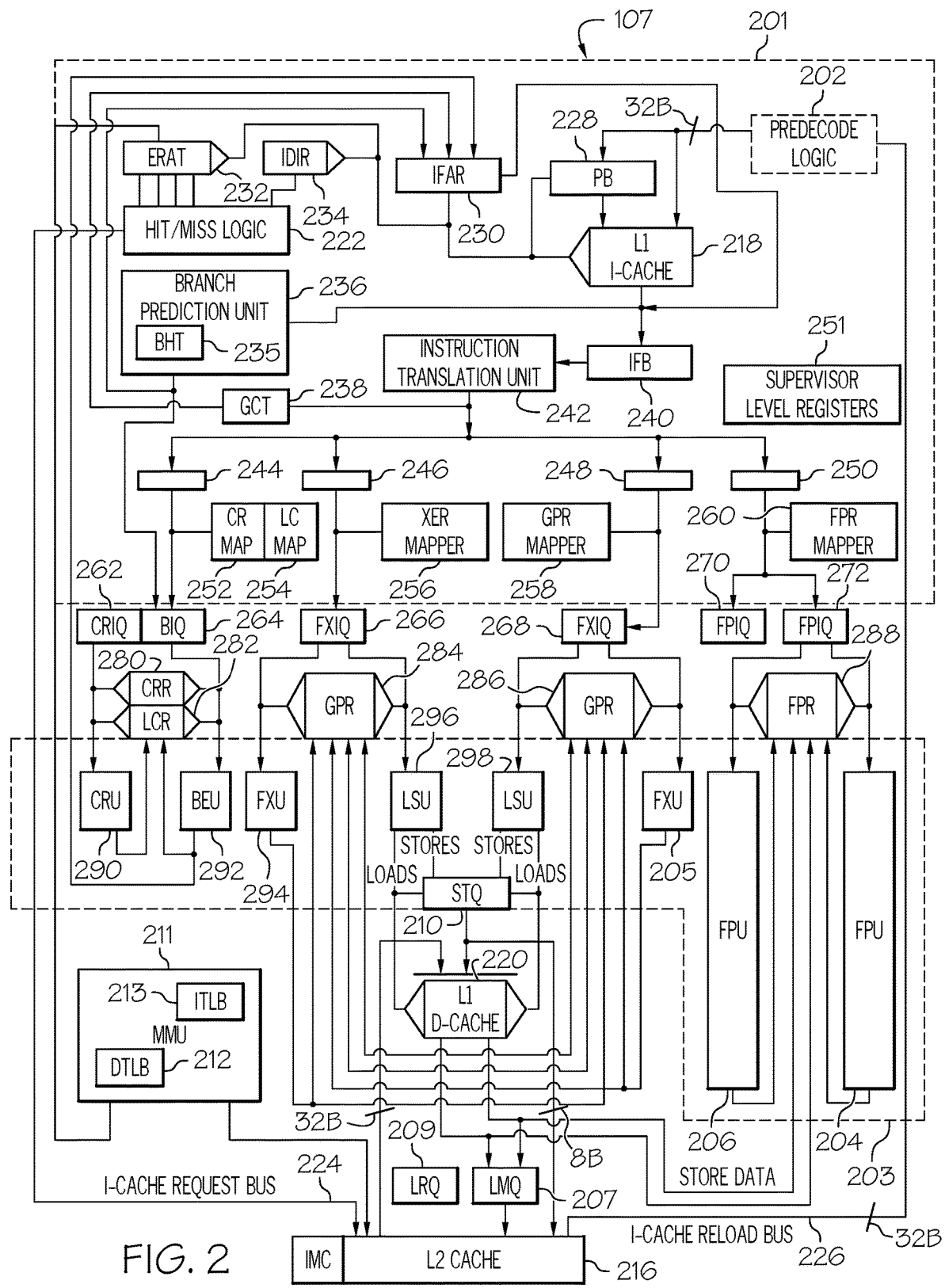
FIG. 2 illustrates additional detail of a core within a processor as used in accordance with one or more embodiments of the present invention.

With reference now to FIG. 2, additional exemplary detail of core 107 depicted in FIG. 1 is presented. Core 107 includes an on-chip multi-level cache hierarchy including a unified level two (L2) cache 216 and bifurcated level one (L1) instruction (I) and data (D) caches 218 and 220, respectively. As is well-known to those skilled in the art, caches 216, 218 and 220 provide low latency access to cache lines corresponding to memory locations in system memories (e.g., system memory 135 shown in FIG. 1).

Instructions are fetched for processing from L1 I-cache 218 in response to the effective address (EA) residing in instruction fetch address register (IFAR) 230. During each cycle, a new instruction fetch address may be loaded into IFAR 230 from one of three sources: branch prediction unit (BPU) 236, which provides speculative target path and sequential addresses resulting from the prediction of conditional branch instructions, global completion table (GCT) 238, which provides flush and interrupt addresses, and branch execution unit (BEU) 292, which provides non-speculative addresses resulting from the resolution of predicted conditional branch instructions. Associated with BPU 236 is a branch history table (BHT) 235, in which are recorded the resolutions of conditional branch instructions to aid in the prediction of future branch instructions.

An effective address (EA), such as the instruction fetch address within IFAR 230, is the address of data or an instruction generated by a processor. The EA specifies a segment register and offset information within the segment. To access data (including instructions) in memory, the EA is converted to a real address (RA), through one or more levels of translation, associated with the physical location where the data or instructions are stored.

Within core 107, effective-to-real address translation is performed by memory management units (MMUs) and associated address translation facilities. Preferably, a separate MMU is provided for instruction accesses and data accesses. In FIG. 2, a single MMU 211 is illustrated, for purposes of clarity, showing connections only to Instruction Store Unit (ISU) 201. However, it is understood by those skilled in the art that MMU 211 also preferably includes connections (not shown) to load/store units (LSUs) 296 and 298 and other components necessary for managing memory accesses. MMU 211 includes Data Translation Lookaside Buffer (DTLB) 212 and Instruction Translation Lookaside Buffer (ITLB) 213. Each TLB contains recently referenced page table entries, which are accessed to translate EAs to RAs for data (DTLB 212) or instructions (ITLB 213). Recently referenced EA-to-RA translations from ITLB 213 are cached in EOP effective-to-real address table (ERAT) 232.

If hit/miss logic 222 determines, after translation of the EA contained in IFAR 230 by ERAT 232 and lookup of the real address (RA) in I-cache directory 234, that the cache line of instructions corresponding to the EA in IFAR 230 does not reside in L1 I-cache 218, then hit/miss logic 222 provides the RA to L2 cache 216 as a request address via I-cache request bus 224. Such request addresses may also be generated by prefetch logic within L2 cache 216 based upon recent access patterns. In response to a request address, L2 cache 216 outputs a cache line of instructions, which are loaded into prefetch buffer (PB) 228 and L1 I-cache 218 via I-cache reload bus 226, possibly after passing through optional predecode logic 202.

Once the cache line specified by the EA in IFAR 230 resides in L1 I-cache 218, L1 I-cache 218 outputs the cache line to both branch prediction unit (BPU) 236 and to instruction fetch buffer (IFB) 240. BPU 236 scans the cache line of instructions for branch instructions and predicts the outcome of conditional branch instructions, if any. Following a branch prediction, BPU 236 furnishes a speculative instruction fetch address to IFAR 230, as discussed above, and passes the prediction to branch instruction queue 264 so that the accuracy of the prediction can be determined when the conditional branch instruction is subsequently resolved by branch execution unit 292.

IFB 240 temporarily buffers the cache line of instructions received from L1 I-cache 218 until the cache line of instructions can be translated by instruction translation unit (ITU) 242. In the illustrated embodiment of core 107, ITU 242 translates instructions from user instruction set architecture (UISA) instructions into a possibly different number of internal ISA (IISA) instructions that are directly executable by the execution units of core 107. Such translation may be performed, for example, by reference to microcode stored in a read-only memory (ROM) template. In at least some embodiments, the UISA-to-IISA translation results in a different number of IISA instructions than UISA instructions and/or IISA instructions of different lengths than corresponding UISA instructions. The resultant IISA instructions are then assigned by global completion table 238 to an instruction group, the members of which are permitted to be dispatched and executed out-of-order with respect to one another. Global completion table 238 tracks each instruction group for which execution has yet to be completed by at least one associated EA, which is preferably the EA of the oldest instruction in the instruction group.

Following UISA-to-IISA instruction translation, instructions are dispatched to one of latches 244, 246, 248 and 250, possibly out-of-order, based upon instruction type. That is, branch instructions and other condition register (CR) modifying instructions are dispatched to latch 244, fixed-point and load-store instructions are dispatched to either of latches 246 and 248, and floating-point instructions are dispatched to latch 250. Each instruction requiring a rename register for temporarily storing execution results is then assigned one or more rename registers by the appropriate one of CR mapper 252, link and count (LC) register mapper 254, exception register (XER) mapper 256, general-purpose register (GPR) mapper 258, and floating-point register (FPR) mapper 260.

The dispatched instructions are then temporarily placed in an appropriate one of CR issue queue (CRIQ) 262, branch issue queue (BIQ) 264, fixed-point issue queues (FXIQs) 266 and 268, and floating-point issue queues (FPIQs) 270 and 272. From issue queues 262, 264, 266, 268, 270 and 272, instructions can be issued opportunistically to the execution units of processor 103 (shown in FIG. 1) for execution as long as data dependencies and antidependencies are observed. The instructions, however, are maintained in issue queues 262-272 until execution of the instructions is complete and the result data, if any, are written back, in case any of the instructions need to be reissued.

As illustrated, the execution units of core 107 include an execution subcomponent 203, which includes a CR unit (CRU) 290 for executing CR-modifying instructions, a branch execution unit (BEU) 292 for executing branch instructions, two fixed-point units (FXUs) 294 and 205 for executing fixed-point instructions, two load-store units (LSUs) 296 and 298 for executing load and store instructions, and two floating-point units (FPUs) 206 and 204 for executing floating-point instructions. Each of execution units 290-204 is preferably implemented as an execution pipeline having a number of pipeline stages.

During execution within one of execution units 290-204, an instruction receives operands, if any, from one or more architected and/or rename registers within a register file coupled to the execution unit. When executing CR-modifying or CR-dependent instructions, CRU 290 and BEU 292 access the CR register (CRR) file 280, which in a preferred embodiment contains a CR and a number of CR rename registers that each comprise a number of distinct fields formed of one or more bits. Among these fields are LT, GT, and EQ fields that respectively indicate if a value (typically the result or operand of an instruction) is less than zero, greater than zero, or equal to zero. Link and count register (LCR) file 282 contains a count register (CTR), a link register (LR) and rename registers of each, by which BEU 292 may also resolve conditional branches to obtain a path address. General-purpose register files (GPRs) 284 and 286, which are synchronized, duplicate register files, and store fixed-point and integer values accessed and produced by FXUs 294 and 205 and LSUs 296 and 298. Note that floating-point register file (FPR) 288, which like GPRs 284 and 286 may also be implemented as duplicate sets of synchronized registers, contains floating-point values that result from the execution of floating-point instructions by FPUs 206 and 204 and floating-point load instructions by LSUs 296 and 298.

After an execution unit finishes execution of an instruction, the execution unit notifies GCT 238, which schedules completion of instructions in program order. To complete an instruction executed by one of CRU 290, FXUs 294 and 205 or FPUs 206 and 204, GCT 238 signals the execution unit, which writes back the result data, if any, from the assigned rename register(s) to one or more architected registers within the appropriate register file. The instruction is then removed from the issue queue and once all instructions within its instruction group have been completed, it is removed from GCT 238. Other types of instructions, however, are completed differently.

When BEU 292 resolves a conditional branch instruction and determines the path address of the execution path that should be taken, the path address is compared against the speculative path address predicted by BPU 236. If the path addresses match, no further processing is required. If, however, the calculated path address does not match the predicted path address, BEU 292 supplies the correct path address to IFAR 230. In either event, the branch instruction can then be removed from BIQ 264, and when all other instructions within the same instruction group have completed executing, from GCT 238.

Following execution of a load instruction, the effective address computed by executing the load instruction is translated to a real address by a data ERAT (not illustrated) and then provided to L1 D-cache 220 as a request address. At this point, the load instruction is removed from FXIQ 266 or 268 and placed in load reorder queue (LRQ) 209 until the indicated load is performed. If the request address misses in L1 D-cache 220, the request address is placed in load miss queue (LMQ) 207, from which the requested data is retrieved from L2 cache 216, and failing that, from another core 107 or from system memory. LRQ 209 snoops exclusive access requests (e.g., read-with-intent-to-modify), flushes or kills on interconnect fabric (not shown) against loads in flight, and if a hit occurs, cancels and reissues the load instruction. Store instructions are similarly completed utilizing a store queue (STQ) 210 into which effective addresses for stores are loaded following execution of the store instructions. From STQ 210, data can be stored into either or both of L1 D-cache 220 and L2 cache 216.

Note that the state of a processor includes stored data, instructions and hardware states at a particular time, and are herein defined as either being "hard" or "soft". The "hard" state is defined as the information within a processor/core that is architecturally required for a processor/core to execute a process from its present point in the process. The "soft" state, by contrast, is defined as information within a processor/core that would improve efficiency of execution of a process, but is not required to achieve an architecturally correct result. In core 107 of FIG. 2, the hard state includes the contents of user-level registers, such as CRR 280, LCR 282, GPRs 284 and 286, FPR 288, as well as supervisor level registers 251. The soft state of core 107 includes both "performance-critical" information, such as the contents of L1 I-cache 218, L1 D-cache 220, address translation information such as DTLB 212 and ITLB 213, and less critical information, such as BHT 235 and all or part of the content of L2 cache 216. Thus, the content of such registers are fixed values that describe a real-time current architecture state register of the processor core 107.

Note that as used to describe core 107 in FIG. 2, L1 denotes lowest level of cache, which is first checked to locate an operand (in the case of a data (D) cache) or data (in the case of a data (D) cache). If the requisite operand/data is not found within the L1 cache (i.e., a "cache miss"), then the next highest level cache memory (L2 cache) is searched. If there is an L2 cache miss, then the next highest L3 cache (if the system has an L3 level cache) is searched. If there is an L2/L3 cache miss, then system memory is searched for the requisite operand/data. If system memory does not have the needed operand/data (e.g., a page fault), then virtual memory, persistent memory (e.g., a hard drive), and/or a memory cloud (e.g., a network of storage devices) are searched for the needed operand or data.

In the description above, register files of core 107 such as GPR 286, FPR 288, CRR 280 and LCR 282 are generally defined as "user-level registers", in that these registers can be accessed by all software with either user or supervisor privileges. Supervisor level registers 251 include those registers that are used typically by an operating system, typically in the operating system kernel, for such operations as memory management, configuration and exception handling. As such, access to supervisor level registers 251 is generally restricted to only a few processes with sufficient access permission (i.e., supervisor level processes).

In one or more embodiments of the present invention, if a hash is desired to generate the proof of the firmware being run on an Internet of Things (IoT) device (as described in further detail below), a core dump from the core 107 shown in FIG. 2 and/or the processor 103 shown in FIG. 1 will occur, thus producing the hard/soft states of core 107 and/or processor 103. A core dump includes a recorded state of memory being used by an application (e.g., firmware 303a or firmware 303b shown in FIG. 3) at the time that a proof of the application is made. That is, the hash is generated from contents of registers and/or buffers and/or caches etc. within the core 107, and/or contents of a program counter and/or a stack pointer and/or OS flags etc. from the processor 103 at a predefined point in the execution of the application/firmware. In one embodiment, the core dump specifically includes contents of the L1 instruction cache 218, the L1 data cache 220, the L2 cache 216, the CRR 280, LCR 282, GPR 284, and/or FPR 288 depicted and described in FIG. 2. Thus, the content of the core dump contains the "hard" state and/or the "soft" state of the core, as described/defined above. As soon as the values from the core dump are hashed, the hash provides the bits needed as the "proof" that a process executed properly.

Figure 3:
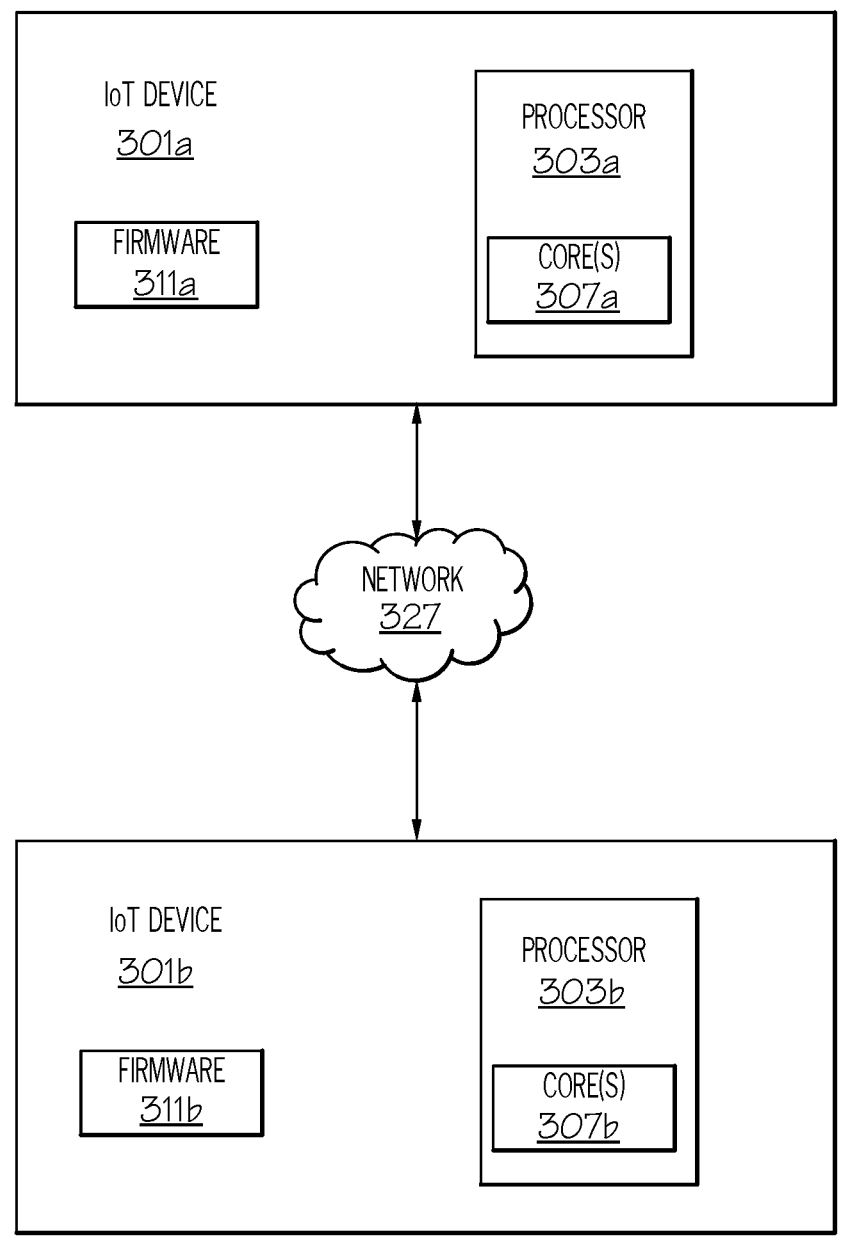
FIG. 3 depicts two Internet of Things (IoT) devices communicatively coupled to one another via a network to create an IoT.

With reference now to FIG. 3, consider IoT devices 301a-301b, which need a way to interoperate based on a commonly supported set of firmware versions of their respective firmware 311a-311b. Firmware 311a and firmware 311b are software loaded onto a memory chip to be accessed by a processor (e.g., processor 303a and/or processor 303b, each of which are analogous to processor 103 shown in FIG. 1 and each of which have a core 307a or core 307b, which are analogous to the core 107 shown in FIG. 1). Alternatively, firmware 311a and/or firmware 311b may be loaded into a memory within the respective processors 303a and 303b.

Firmware 311a/311b is firmware that allows IoT device 301a and IoT device 301b to collectively act as an Internet of Things (IoT).

For example, assume that IoT device 301a is a central controller on an automobile, and IoT device 301b is a braking control system for the automobile. If the central controller sends an instruction to the braking control system, it is imperative that firmware 311a and firmware 311b be functionally equivalent. That is, assume that IoT device 301a (the central controller on the automobile) sends IoT device 301b (the braking control system for the automobile) an instruction to stop the automobile. If the version of firmware 311b is incompatible with the version of the firmware 311a (i.e., incorrect results will occur if firmware 311a and firmware 311b interact with one another and they are incompatible), then the braking control system may misinterpret the instruction from the central controller, thus perhaps causing a catastrophic result (e.g., the automobile does not stop).

Due to scaling and potentially limited connectivity, it is desirable for devices such as IoT devices 301a-301b shown in FIG. 3 to establish secure communications and version control using peer-to-peer interactions and without revealing specific software version and patching details that might increase their vulnerability to hacking, or to enable information to be gathered from them which combinatorially might reveal private information about device owners.

Thus, the present invention presents a firmware/software version management system for peer-to-peer IoT management using a specific Zero Knowledge Proof (ZKP) cryptographic method to provide mathematically assured integrity and privacy.

The IoT devices 301a-301b utilize a Version Challenge Program (VCP) to ensure that IoT devices 301a-301b have a same (or at least functionally identical) version of the firmware 311a-311b. The VCP is part of the PVFLIoTD 147 shown in FIG. 1 when loaded into the processors 303a-303b shown in FIG. 3.

Each of the IoT devices 301a-301b collect statistics of version numbers by device type of all participating nodes (e.g., IoT devices 301a-301b depicted in FIG. 3). The VCP downloads these statistics and allows the node (e.g., IoT devices 301a) to determine whether it needs to update its firmware/software (e.g., firmware 311a) as a result, using a set of consensus-based rules. These consensus-based rules determine behavior based on the percentage of nodes running certain versions, or ranges of versions, as determined by the device manufacturer. These rules may include:

What percentage of nodes must be up to date with a certain release of firmware/software or newer, before a new major feature becomes active across the network;

What release (or older) is considered out of date and deprecated, and not permitted to participate in the peer to peer network. This may include multiple levels of support and deprecation, for example:

Full participation in higher-layer software functions requires a recent enough version that it can act as a server for downloads to other nodes for base firmware or device specific higher software;

Full participation in higher-layer software functions, but not recent enough to act as a server for others, requires a less up-to-date version of the firmware;

Participation in peer registry, including the ability to pass along messages between nodes but not participate in higher functions, requires an even less up-to-date version of the firmware;

Out of support indicates that an even less up-to-date version of firmware is in the node, which is thus able to attach to the network 327 but is deprecated and thus not able to participate in the registry;

Deprecated indicates that the node is able to connect only to download version consensus and new firmware/software updates.

These rules may include a range of options for how soon an update is needed and when new features become active across the peer network, from "immediately active per node" to "not active until 100% of non-deprecated nodes have the feature."

Version management may include both a common base version of firmware that may be common across multiple device types, as well as higher-layer software specific to a particular device type in a broad class of devices.

In a preferred embodiment of the system, nodes implement cryptographically signed firmware/software and a hardware-rooted chain of trust (i.e., Trusted Computing), which cryptographically verifies the system's firmware/software stack at boot time. The VCP may also obtain a cryptographically strong attestation of the stored results of the measured boot process to verify that the version is not only correct but that the full stack of software is untampered with.

Figure 4:
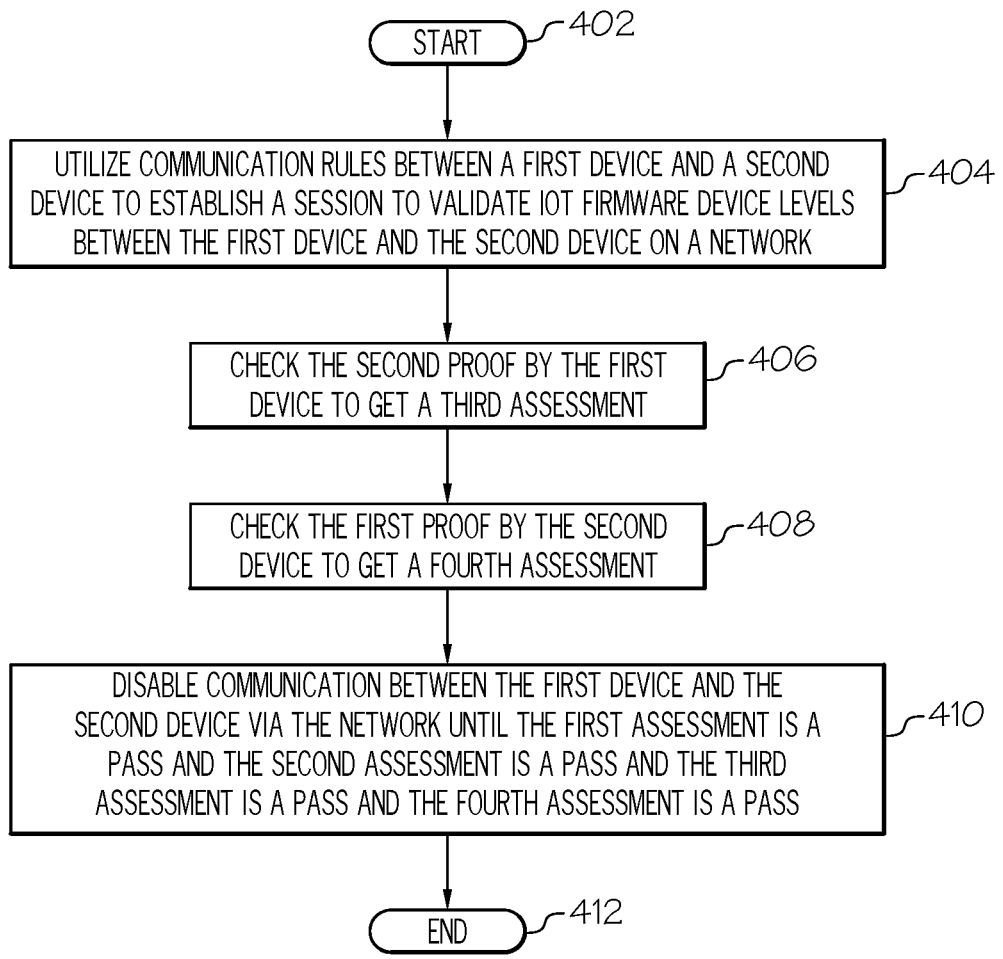
FIG. 4 is a high level flow chart of one or more steps performed by one or more processors and/or other hardware devices to validate Internet of Things (IoT) device firmware levels for peer-to-peer communication in a network in accordance with one or more embodiments of the present invention.

With reference now to FIG. 4, a high level flow chart of one or more steps performed by one or more processors and/or other hardware devices to validate Internet of Things (IoT) device firmware levels for peer-to-peer communication in a network in accordance with one or more embodiments of the present invention is presented.

After initiator block 402, communication rules between a first device and a second device are used to establish a session to validate IoT firmware device levels between the first device (e.g., IoT device 301a shown in FIG. 3) and the second device (e.g., IoT device 301b shown in FIG. 3) on a network (e.g., network 327 shown in FIG. 3), as described in block 404.

The first device utilizes a first zero knowledge communication authentication with the second device to get a first assessment and a first proof, and the second device utilizes a second zero knowledge communication authentication with the first device to get a second assessment and a second proof.

The terms "zero knowledge communication authentication" mean that the authentication is based on a Zero Knowledge Proof (ZKP). ZKP means that any processing, software, etc. used by either of the devices is hidden from the other device. Thus, there is "zero knowledge" by a device/node as to what resources the other device/node is using. However, an assessment and a proof are returned to a challenger device from a challenged device.

For example, assume that IoT device 301a sends a value "10" to IoT device 301b, with instructions to IoT device 301b to use the value "10" as an input when executing firmware 311b. Executing firmware 311b with the input of "10" will result in an answer (output known as an "assessment"), such as "20". This answer ("20") is returned to IoT device 301a. If IoT device 301a was expecting that the output from firmware 311b would be "20", then this answer provides an initial indicator that IoT device 301b is using the proper (up to date) version of firmware 311b. However, since IoT device 301a is not able to "see" firmware 311b (due to the ZKP aspect of the system), IoT device 301a needs additional proof that IoT device 301b is running a correct version of firmware 311b.

As such, the IoT device 301a also needs to receive a copy of a proof, which is a probabilistically checkable cryptographic representation of intermediate states, which may derived from a hashed value of intermediate states of core 307b while executing firmware 311b. Such intermediate states may be at the processor level or at the core level.

For example, at the processor level, the intermediate processor states are found in the contents of a program counter, a stack pointer, and/or OS flags in the processor 303b while executing the firmware 311b. That is, these intermediate states are recorded cryptographically during execution in the form a of concise "proof" that can be tested by a separate program at execution time. In one embodiment, such states are those found in higher-level processor functions, such as pointers to other instructions, program line addresses, program instruction counts, etc.

At the core level, the intermediate core states of the core 307b include a hard state and a soft state of the core 307b. The hard state is information within the core 307b that is architecturally required for the core 307b to execute a process (e.g., execute firmware 311b using the input provided by IoT device 301a) from a present point in the process, and the soft state is information within the core 307b that improves an efficiency of execution of the process, but is not required to achieve an architecturally correct result.

For example and as presented above when describing FIG. 2, the hard state and the soft state of the core 307b are contents of an L1 instruction cache, an L1 data cache, an L2 cache, a condition register register (CRR), a link count register (LCR), a general purpose register (GPR), and/or a floating point register (FPR) within the core 307b.

In one embodiment of the present invention, the proof will be taken at a predetermined point during the execution of firmware 311b. That is, the information taken from the core (e.g., contents of an L1 instruction cache, an L1 data cache, an L2 cache, a condition register register (CRR), a link count register (LCR), a general purpose register (GPR), and/or a floating point register (FPR) within the core 307b) and higher level of the processor (e.g., pointers, line counts, etc.) are taken at a predefined point in the execution of the firmware 311b. Thus, there will be a consistent state/data content in the core/processor based on which instructions in the firmware execution are being executed. For example, assume that the firmware has instructions 1, 2, and 3. In order to "know what to expect" in the proof, the system will take a "snapshot" of the processor/core information just as instruction 2 is about to execute.

Once these values (for the intermediate processor states and the intermediate core states) are retrieved, they are hashed to generate a proof in the form of a string of bits. If every bit in the proof is what IoT device 301a is expecting, then this guarantees that firmware 311b is the correct version of the correct firmware/software. However, the entire proof need not be sent to IoT device 301a. That is, if IoT device 301b is running the wrong firmware, then there still is a 50:50 chance that each bit in the has will be correct. However, the odds of ten bits in the proof being guessed and correct are only one in 1,024 (1 in $2^{10}$), and the odds of 20 bits in the has being guessed and correct are only one in 1,048,576 (1 in $2^{20}$). Thus, even as few as 6 bits may be enough to satisfy IoT device 301a to trust that IoT device 301b is running the correct version of firmware 311b (i.e., the odds are 1 in 64 that IoT device 301b is "guessing" the value of the proof bits and not executing the proper version of firmware 311b). Thus, a number of bits in the proof may be selected for verifying the firmware in order to ensure that the correct version of the firmware 311b is running on the IoT device 301b. For example, 10 bits from the proof may be selected in order to verify firmware 311b as being compatible with firmware 311a.

Likewise, IoT device 301b will also query IoT device 301a, using the same type of assessment and proof values provided by IoT device 301a to IoT device 301b as described above.

As described in block 406 of FIG. 4, one or more processors (e.g., processor 303a shown in FIG. 3) check the second proof by the first device to get a third assessment. That is, the bits from the proof of intermediate states for processor 303a and core 307a when executing firmware 303a with the input provided by IoT device 301b are then used as an input to firmware 311a, which outputs a new result known as the third assessment.

As described in block 408 of FIG. 4, processor 303b then checks the first proof (created by IoT device 301b) by running to get a fourth assessment. That is, the bits from the proof of intermediate states for processor 303b and core 307b when executing firmware 311b with the input provided by IoT device 301a are then used as an input to firmware 311b, which outputs a new result known as the fourth assessment.

As described in block 410, communication between the first device and the second device via the network is then disabled until the first assessment is a pass and the second assessment is a pass and the third assessment is a pass and the fourth assessment is a pass. That is, only if the IoT device 301a approves (passes) the first assessment and the third assessment, and only if the IoT device 301b approves (passes) the second assessment and the fourth assessment, will communication between the IoT device 301a and IoT device 301b be allowed to proceed.

The flow chart ends at terminator block 412.

As described herein, in one or more embodiments of the present invention the communication rules are based on a percentage of devices in the IoT that must be loaded with a most recent version of the firmware in order to allow the first device and the second device to communicate. For example, assume that not only IoT device 301a and IoT device 301b make up an IoT, but many other IoT devices (not shown) are also part of the IoT. As such, in order for IoT device 301a and IoT device 301b to be allowed to communicate, a certain percentage (e.g., 80%) must be loaded with the latest version of firmware 311a/311b shown in FIG. 3, thus ensuring that most of the IoT is running the same version of the firmware 311a/311b.

As described above, in one or more embodiments of the present invention the communication rules are based on a version of the firmware loaded in the first device, and one or more processors (e.g., processor 303b shown in FIG. 3) determines that the version of the firmware 311a loaded in the first IoT device 301a is at a predetermined first level (e.g., is a version of the firmware 311a that is qualified to perform a certain level of functionality). Thus, in response to determining that the version of the firmware loaded in the first device is at the predetermined first level, the first device is utilized as a server for downloading the firmware to the second device (IoT device 301b).

In another embodiment, assume that the communication rules are based on a version of the firmware 311a loaded in the first IoT device 301a, and that a determination has been made by one or more processors (e.g., processor 303b) that the version of the firmware loaded in the first device is at a predetermined second level, which is less up-to-date (and thus less trustworthy) than firmware that is at the predetermined first level just described. As such, in response to determining that the version of the firmware loaded in the first device is at the predetermined second level, processor 303b will permit the first IoT device 301a to modify the firmware 311a loaded in the first IoT device 301, but will prohibit the first IoT device 301a from downloading updated versions of the firmware to the second IoT device 301b.

The present invention may be implemented in one or more embodiments using cloud computing. Nonetheless, it is understood in advance that although this disclosure includes a detailed description on cloud computing, implementation of the teachings recited herein is not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 5:
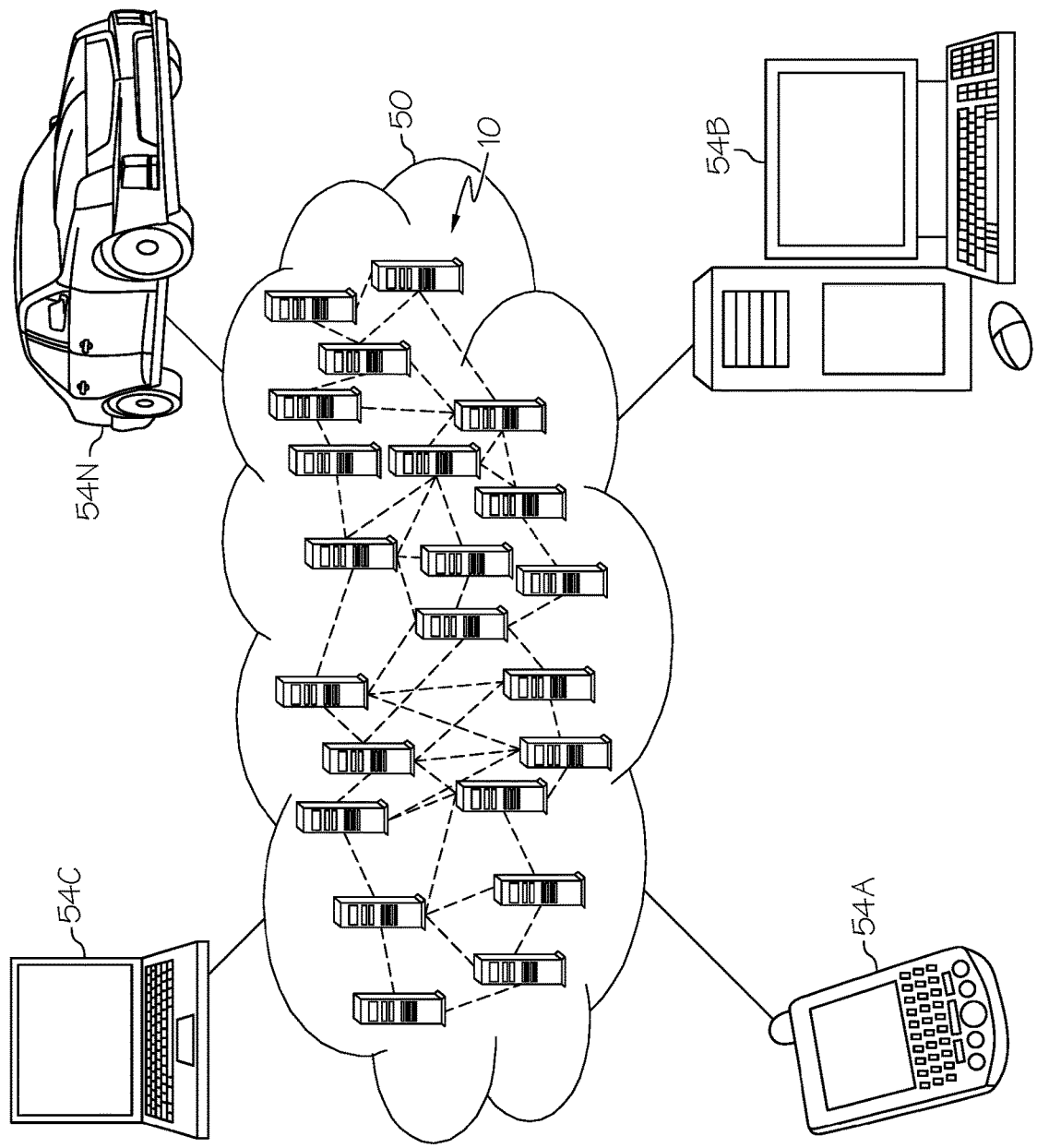
FIG. 5 depicts a cloud computing environment according to an embodiment of the present invention.

Referring now to FIG. 5, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-54N shown in FIG. 5 are intended to be illustrative only and that computing nodes 10 and cloud computing environment 50 can communicate with any type of computerized device over any type of network and/or network addressable connection (e.g., using a web browser).

Figure 6:
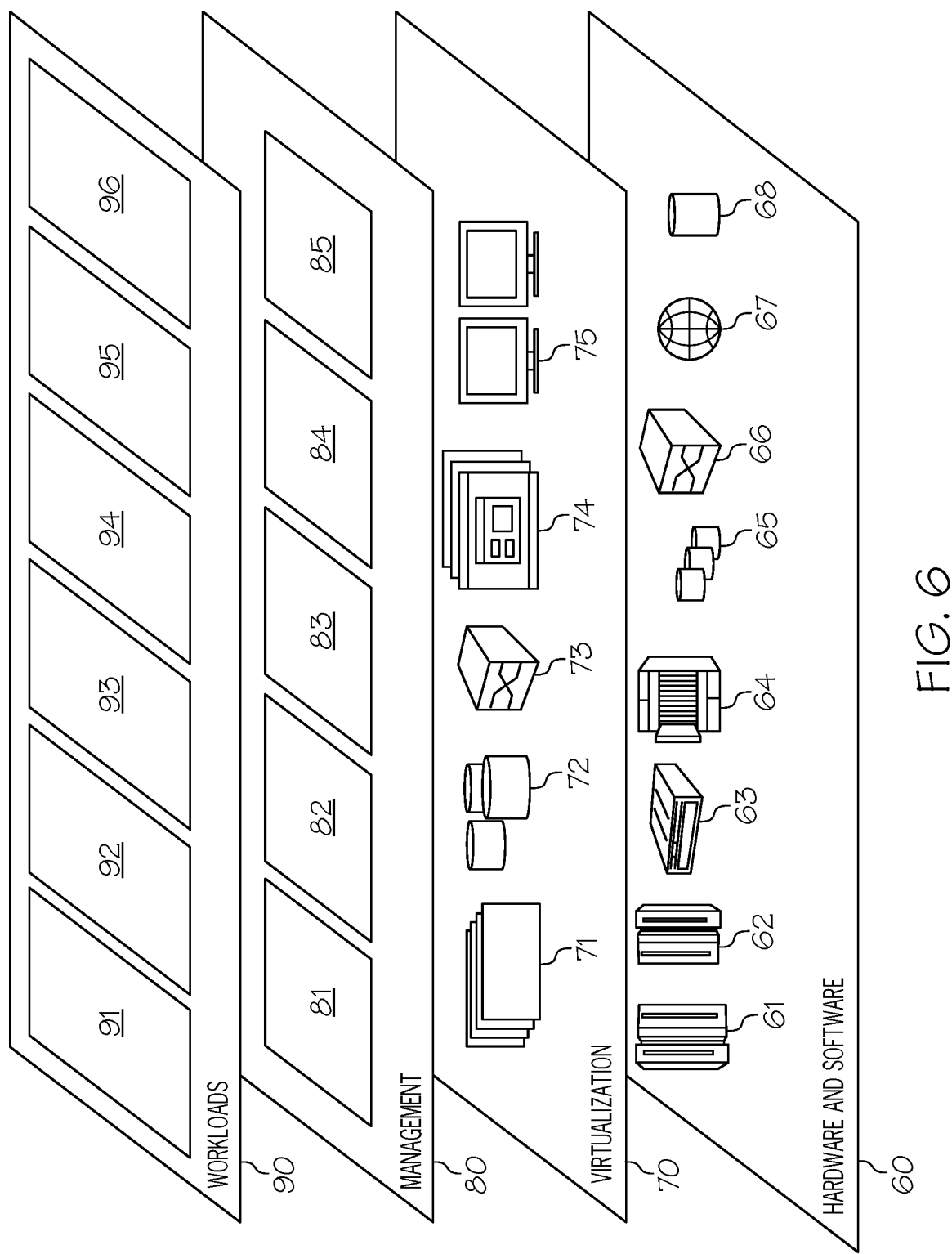
FIG. 6 depicts abstraction model layers of a cloud computer environment according to an embodiment of the present invention.

Referring now to FIG. 6, a set of functional abstraction layers provided by cloud computing environment 50 (FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and validation of IoT device firmware levels processing 96, which performs one or more of the features of the present invention described herein.

The terminology used herein is for the purpose of describing particular embodiments only and is not intended to be limiting of the present invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of various embodiments of the present invention has been presented for purposes of illustration and description, but is not intended to be exhaustive or limited to the present invention in the form disclosed. Many modifications and variations will be apparent to those of ordinary skill in the art without departing from the scope and spirit of the present invention. The embodiment was chosen and described in order to best explain the principles of the present invention and the practical application, and to enable others of ordinary skill in the art to understand the present invention for various embodiments with various modifications as are suited to the particular use contemplated.

Any methods described in the present disclosure may be implemented through the use of a VHDL (VHSIC Hardware Description Language) program and a VHDL chip. VHDL is an exemplary design-entry language for Field Programmable Gate Arrays (FPGAs), Application Specific Integrated Circuits (ASICs), and other similar electronic devices. Thus, any software-implemented method described herein may be emulated by a hardware-based VHDL program, which is then applied to a VHDL chip, such as a FPGA.

Having thus described embodiments of the present invention of the present application in detail and by reference to illustrative embodiments thereof, it will be apparent that modifications and variations are possible without departing from the scope of the present invention defined in the appended claims.

What is claimed is:

1. A computer-implemented method comprising:

utilizing communication rules between a first device and a second device to establish a session to validate firmware levels between the first device and the second device on a network, wherein the first device utilizes a first zero knowledge communication authentication with the second device to get a first assessment and a first proof, wherein the second device utilizes a second zero knowledge communication authentication with the first device to get a second assessment and a second proof, wherein the first and second assessments are outputs of respective firmware in the second device and the first device using a known input, wherein the first proof and the second proof are reports derived from hashed values of respective intermediate states during execution of firmware in the second device and the first device, wherein the hashed values of the respective intermediate states during execution of the firmware in the first device are made up of a string of bits;

determining, by one or more processors, whether a predetermined portion of the string of bits matches a known string of correct bits for the first proof, wherein the predetermined portion is less than all of the string of bits;

in response to determining that the predetermined portion of the string of bits does not match the known string of correct bits for the first proof, determining that firmware in the first device is not compatible with firmware in the second device; and in response to determining that the firmware in the first device is not compatible with firmware in the second device, disabling communication between the first device and the second device via the network.

2. The computer-implemented method of claim 1, wherein the communication rules are based on a percentage of devices that must be loaded with a most recent version of the firmware in order to allow the first device and the second device to communicate.

3. The computer-implemented method of claim 1, wherein the communication rules are based on a version of the firmware loaded in the first device, and wherein the computer-implemented method further comprises:

determining, by one or more processors, that the version of the firmware loaded in the first device is at a predetermined first level; and in response to determining that the version of the firmware loaded in the first device is at the predetermined first level, utilizing the first device as a server for downloading the firmware to the second device.

4. The computer-implemented method of claim 1, wherein the communication rules are based on a version of the firmware loaded in the first device, and wherein the computer-implemented method further comprises:

determining, by one or more processors, that the version of the firmware loaded in the first device is at a predetermined second level; and in response to determining that the version of the firmware loaded in the first device is at the predetermined second level, permitting, by one or more processors, the first device to modify the firmware loaded in the first device while prohibiting the first device from downloading updated versions of the firmware to the second device.

5. The computer-implemented method of claim 1, wherein the respective intermediate states of the first device and the second device are contents from a program counter, a stack pointer, and OS flags in processors running on the first device and the second device.

6. The computer-implemented method of claim 1, wherein the respective intermediate states of the first device and the second device are a hard state and a soft state of cores in the first device and the second device, and wherein the hard state and the soft state of the cores are contents of an L1 instruction cache, an L1 data cache, an L2 cache, a condition register register (CRR), a link count register (LCR), a general purpose register (GPR), and a floating point register (FPR) within each of the cores.

7. A computer program product comprising one or more computer readable storage mediums, and program instructions stored on at least one of the one or more computer readable storage mediums, the stored program instructions comprising:

program instructions to utilize communication rules between a first device and a second device to establish a session to validate firmware levels between the first device and the second device on a network, wherein the first device utilizes a first zero knowledge communication authentication with the second device to get a first assessment and a first proof, wherein the second device utilizes a second zero knowledge communication authentication with the first device to get a second assessment and a second proof, wherein the first and second assessments are outputs of respective firmware in the second device and the first device using a known input, wherein the first proof and the second proof are reports derived from hashed values of respective intermediate states during execution of firmware in the second device and the first device, wherein the hashed values of the respective intermediate states during execution of the firmware in the first device are made up of a string of bits;

program instructions to determine whether a predetermined portion of the string of bits matches a known string of correct bits for the first proof, wherein the predetermined portion is less than all of the string of bits;

program instructions to, in response to determining that the predetermined portion of the string of bits does not match the known string of correct bits for the first proof, determine that firmware in the first device is not compatible with firmware in the second device; and program instructions to, in response to determining that the firmware in the first device is not compatible with firmware in the second device, disable communication between the first device and the second device via the network.

8. The computer program product of claim 7, wherein the communication rules are based on a percentage of devices that must be loaded with a most recent version of the firmware in order to allow the first device and the second device to communicate.

9. The computer program product of claim 7, wherein the communication rules are based on a version of the firmware loaded in the first device, and wherein the computer program product further comprises:

program instructions to determine that the version of the firmware loaded in the first device is at a predetermined first level; and program instructions to, in response to determining that the version of the firmware loaded in the first device is at the predetermined first level, utilize the first device as a server for downloading the firmware to the second device.

10. The computer program product of claim 7, wherein the communication rules are based on a version of the firmware loaded in the first device, and wherein the computer program product further comprises:
  program instructions to determine that the version of the firmware loaded in the first device is at a predetermined second level; and
  program instructions to, in response to determining that the version of the firmware loaded in the first device is at the predetermined second level, permit the first server to modify the firmware loaded in the first device while prohibiting the first device from downloading updated versions of the firmware to the second device.

11. The computer program product of claim 7, wherein the respective intermediate states of the first device and the second device are contents from a program counter, a stack pointer, and OS flags in processors running on the first device and the second device.

12. The computer program product of claim 7, wherein the respective intermediate states of the first device and the second device are a hard state and a soft state of cores in the first device and the second device, and wherein the hard state and the soft state of the cores are contents of an L1 instruction cache, an L1 data cache, an L2 cache, a condition register register (CRR), a link count register (LCR), a general purpose register (GPR), and a floating point register (FPR) within each of the cores.

13. The computer program product of claim 7, wherein the stored program instructions are provided as a service in a cloud environment.

14. A computer system comprising one or more processors, one or more computer readable memories, and one or more computer readable storage mediums, and program instructions stored on at least one of the one or more computer readable storage mediums for execution by at least one of the one or more processors via at least one of the one or more computer readable memories, the stored program instructions comprising:
  program instructions to utilize communication rules between a first device and a second device to establish a session to validate firmware levels between the first device and the second device on a network, wherein the first device utilizes a first zero knowledge communication authentication with the second device to get a first assessment and a first proof, wherein the second device utilizes a second zero knowledge communication authentication with the first device to get a second assessment and a second proof, wherein the first and second assessments are outputs of respective firmware in the second device and the first device using a known input, wherein the first proof and the second proof are reports derived from hashed values of respective intermediate states during execution of firmware in the second device and the first device, wherein the hashed values of the respective intermediate states during execution of the firmware in the first device are made up of a string of bits;
  program instructions to determine whether a predetermined portion of the string of bits matches a known string of correct bits for the first proof, wherein the predetermined portion is less than all of the string of bits;
  program instructions to, in response to determining that the predetermined portion of the string of bits does not match the known string of correct bits for the first proof, determine that firmware in the first device is not compatible with firmware in the second device; and
  program instructions to, in response to determining that the firmware in the first device is not compatible with firmware in the second device, disable communication between the first device and the second device via the network.

15. The computer system of claim 14, wherein the communication rules are based on a percentage of devices that must be loaded with a most recent version of the firmware in order to allow the first device and the second device to communicate.

16. The computer system of claim 14, wherein the communication rules are based on a version of the firmware loaded in the first device, and wherein the computer program product further comprises:
  program instructions to determine that the version of the firmware loaded in the first device is at a predetermined first level; and
  program instructions to, in response to determining that the version of the firmware loaded in the first device is at the predetermined first level, utilize the first device as a server for downloading the firmware to the second device.

17. The computer system of claim 14, wherein the communication rules are based on a version of the firmware loaded in the first device, and wherein the computer program product further comprises:
  program instructions to determine that the version of the firmware loaded in the first device is at a predetermined second level; and
  program instructions to, in response to determining that the version of the firmware loaded in the first device is at the predetermined second level, permit the first device to modify the firmware loaded in the first device while prohibiting the first device from downloading updated versions of the firmware to the second device.

18. The computer system of claim 14, wherein the respective intermediate states of the first device and the second device are contents from a program counter, a stack pointer, and OS flags in processors running on the first device and the second device.

19. The computer system of claim 14, wherein the respective intermediate states of the first device and the second device are a hard state and a soft state of cores in the first device and the second device, wherein the hard state and the soft state of the cores are contents of an L1 instruction cache, an L1 data cache, an L2 cache, a condition register register (CRR), a link count register (LCR), a general purpose register (GPR), and a floating point register (FPR) within each of the cores.

20. The computer system of claim 14, wherein the stored program instructions are provided as a service in a cloud environment.

* * * * *